United States Patent [19]

Okada

[11] Patent Number: 5,076,755
[45] Date of Patent: Dec. 31, 1991

[54] BEARING DEVICE FOR HIGH SPEED ROTARY SHAFT

[75] Inventor: Masaki Okada, Yokohama, Japan

[73] Assignee: Isuzu Motors Limited, Tokyo, Japan

[21] Appl. No.: 494,341

[22] Filed: Mar. 16, 1990

[30] Foreign Application Priority Data

Apr. 13, 1989 [JP] Japan .................................. 1-91834

[51] Int. Cl.⁵ ...................... F01D 19/00; F16C 27/00
[52] U.S. Cl. ........................................ 415/17; 415/34; 415/111; 415/229; 384/99; 384/448
[58] Field of Search ............... 415/110, 111, 112, 229, 415/10, 14, 16, 17, 30, 33, 34, 25, 170.1; 384/99, 448

[56] References Cited

U.S. PATENT DOCUMENTS

| | | | |
|---|---|---|---|
| 2,571,802 | 10/1951 | Wilfley et al. | 415/34 |
| 2,961,277 | 11/1960 | Sternlicht | 384/99 |
| 3,124,395 | 3/1964 | Sternlicht | 384/110 |
| 3,688,504 | 9/1972 | Hutchinson et al. | 415/17 |
| 3,963,283 | 6/1976 | De Feo et al. | 384/276 |
| 4,422,779 | 12/1983 | Hamaekers et al. | 384/99 |
| 4,626,111 | 12/1986 | Swasey et al. | 384/99 |
| 4,781,525 | 11/1988 | Hubbard et al. | 415/17 |
| 4,915,510 | 4/1990 | Arvidsson | 384/99 |

FOREIGN PATENT DOCUMENTS

| | | |
|---|---|---|
| 310426 | 5/1989 | European Pat. Off. |
| 2375483 | 7/1978 | France |
| 62-51723 | 3/1987 | Japan |

Primary Examiner—Edward K. Look
Assistant Examiner—Hoane Nguyen
Attorney, Agent, or Firm—Browdy and Neimark

[57] ABSTRACT

This invention discloses a bearing device for a high speed rotary shaft comprising a functional bearing disposed on a shaft which is supported rotatably on a housing by a pair of bearings, and capable of supporting rotatably the shaft, a rotation sensor for detecting the revolution of the shaft and a controller for changing the functional bearing to a shaft supporting state in response to a rotation detection signal from the rotation sensor representing that the number of revolution of the shaft is above a predetermined number of revolution. When the shaft rotates at a low speed, the functional bearing is set to a free state and the shaft is supported at two points on the housing by the pair of bearings alone. When the shaft rotates at a high speed, the functional bearing is operated so that the shaft is supported at three points on the housing to prevent the occurrence of deflection of the shaft.

4 Claims, 4 Drawing Sheets

BEARING DEVICE FOR HIGH SPEED ROTARY SHAFT

BACKGROUND OF THE INVENTION:

1. Field of the Invention

This invention relates to a bearing device for a high speed rotary shaft which supports a rotary shaft rotating at a ultra-high speed.

2. Description of the Prior Art

A turbo-charger for effectively utilizing exhaust energy by disposing a motor-generator to a shaft of a turbine driven by exhaust energy of an engine is disclosed, for example, in Japanese Patent Laid-Open No. 51723/1987. Such a turbo-charger will be explained with reference to FIG. 7 of the accompanying drawings. The turbo-charger 61 comprises a turbine 63 driven by exhaust gas energy of an internal combustion engine and a compressor 62 which is driven by the turbine 63 and supercharges air into a cylinder. It also includes a motor-generator 64 driven by the turbine 63 and moreover, the turbine 63, the motor-generator 64 and the compressor 62 are disposed sequentially on a shaft 66. The motor-generator 64 is operated either as a motor or as a generator in accordance with the operating condition of the internal combustion engine. The number of revolution of the shaft 66 of the turbo-charger 61 ranges from a low speed revolution range to a ultra-high speed revolution range of about 150,000 to 200,000 rpm, from time to time. In this turbo-charger 61, a blade 69 of the turbine 63 is disposed at one of the ends of the shaft 66 and an impeller 68 of the compressor 62 is fitted to the other end, and the motor-generator 64 having a rotor 71 and a stator winding 72 is disposed between the blade 69 and the impeller 68. A pair of bearings 65, 65 are disposed on the shaft between the blade 60 of the turbine 63 and the motor-generator 64 in order to support rotatably the shaft 66 on a housing 70. A lubricating oil or lubricant is supplied to the bearing portion of these bearings 65, 65 through a lubricant passage 67 formed on the housing 70 to lubricate them.

In the structure described above wherein the shaft 66 is supported by the pair of bearings 65, 65, the support portion of the bearings 65 is one-sided and the great masses such as the rotor 71 of the motor-generator 64 and the impeller 68 of the compressor 62 are disposed at the other end, the rotation-supporting state of the shaft 66 does not cause any trouble as represented by solid line a in FIG. 5 when the shaft 66 rotates at a low speed of revolution such as below 120,000 rpm, but the following problems occur when it rotates at a high speed revolution. When the shaft 66 rotates at a high speed revolution such as 120,000 rpm or more, for example, the centrifugal force becomes great due to the high speed rotary members such as the rotor 71 and the impeller 68 so that unbalance occurs in the shaft 66 and deflection of the shaft 66 becomes great as represented by dash line b in FIG. 5. Therefore, balance correction of the shaft 66 becomes necessary in order to prevent deflection of the shaft 66. The natural frequency of the shaft drops and resonance number of revolution drops, too, so that amplitude of deflection becomes great.

For the reasons described above, the acceptable range as the maximum value of the normal number of revolution is 120,000 rpm, for example, in the case of two-point structure where the shaft 66 is supported by two bearings 65 but when the number of revolution of the shaft 66 increases and enters a high speed revolution range, the deflection of the shaft 66 becomes so great that the revolution of the shaft 66 cannot be raised to a rated number of revolution such as 150,000 rpm, for example.

In order to let the shaft withstand the high speed revolution and to prevent the occurrence of deflection of the shaft, therefore, counter-measures have been attempted by by increasing the diameter of the shaft or selecting a suitable material to improve rigidity, reducing the weight of adding masses such as the stator and the impeller or making ultra-precision correction of the unbalance quantity. If such counter-measures are employed, however, friction increases between the components rotating relative to one another and response such as the rotation and stop of the shaft and its rotation control gets deteriorated. Moreover, efficiency of the turbo-charger and the motor-generator drops, producibility drops also and the cost of production increases.

SUMMARY OF THE INVENTION

The primary object of the present invention is to solve the problems described above. In a structure wherein rotary members having a large mass are fixed to both ends of a shaft and one of the ends of the shaft is supported rotatably by a pair of bearings with the other end being kept under the free state such as a structure of a turbo-charger wherein a blade of a turbine as a first rotary member is fitted to one of the ends of a shaft, an impeller of a compressor as a second rotary member is fitted to the other end, a motor-generator having a rotor as a third rotary member is disposed between the blade and the impeller and the portion of the shaft between the blade and the motor-generator is supported rotatably on a housing by a pair of bearings; the present invention is directed to provide a bearing device for a high speed rotary shaft employing the structure wherein the shaft described above is supported rotatably by the two bearings described above in the revolution range up to the normal number of revolution of the shaft on the basis of the concept that the problem of shaft deflection does not occur at the normal number of revolution of the shaft such as up to about 120,000 rpm but does occur beyond this level, the shaft is supported by one more bearing besides the two bearing described above or by three bearings in all in the high speed revolution range of the shaft, as shown by solid line c of FIG. 5, in order to prevent the increase of friction between the components rotating relatively to one another at the low speed revolution range, to prevent the drop of response of the rotation and stop of the shaft and its rotation control and to prevent the drop of efficiency of the turbo-charger and the motor-generator.

It is a first object of the present invention to provide a bearing device for a high speed rotary shaft which includes a functional bearing disposed on a shaft supported rotatably by a pair of bearings on a housing and capable of supporting rotatably the shaft, a rotation sensor for detecting the number of revolution of the shaft and a controller for changing the functional bearing to the shaft supporting state in response to a rotation detection signal of the rotation sensor representing that the number of revolution of the shaft is above a predetermined number of revolution. This bearing device can support the shaft in the three-point supporting structure by the three bearings at the time of high speed revolution of the shaft and changes the shaft to the three-point supporting bearing structure so as to prevent large deflection occurring at the free end of the shaft and to prevent the occurrence of oscillation of the shaft, to ensure the smooth revolution of the shaft, to prevent non-revolution of the shaft due to its deflection, to improve reliability of the revolution of the shaft in the high speed revolution range and its response, without inviting a mechanical loss. Moreover, the bearing device of the invention eliminates friction of the functional bearing to the shaft when the shaft rotates at a high speed revolution.

It is another object of the prevent invention to provide a bearing device for a high speed rotary shaft wherein the functional bearing described above consists of a first ring-like bearing member having a taper surface fitted to the shaft, a second ring-like bearing member having a taper surface capable of coming into contact with the taper surface of the first ring-like bearing member, and capable of moving in an axial direction, and an actuator for moving the second ring-like bearing member in the axial direction by the operation of an oil pressure, equipped with a ring-like bellows pipe, and wherein the increase of the mass to the shaft is only the mass of the first ring-like bearing member when the functional bearing is out of the operating state, hence the mass of the shaft is not much increased, the rotating motion of the shaft is not impeded, the functional bearing itself is a bearing of a kind of a fluid pressure, the fluid pressure can be controlled in response to the number of revolution of the shaft and the bearing force can be controlled damper-wise.

It is still another object of the present invention to provide a bearing device for a high speed rotary shaft wherein a through-hole for supplying an oil as the operation fluid of the actuator to a contact surface between the taper surfaces of the first and second ring-like bearing members is formed on the second ring-like bearing member so as to lubricate the contact surface described above and to obtain an excellent bearing surface on the contact surface or in other words, on the taper surfaces, moreover the lubrication function can be exhibited at the time of the operation of the functional bearing because the feed port is the through-hole described above, any lubrication means need not be disposed, in particular, the cost of production can be reduced and the construction can thus be simplified.

In a turbo-charger of the type wherein a blade of a turbine is fixed to one of the ends of a shaft, an impeller of a compressor is fixed to the other end, a motor-generator is disposed on the shaft and the shaft portion between the blade and the motor-generator is supported rotatably by a pair of bearing on a housing, it is still another object of the present invention to provide a bearing device for a high speed rotary shaft which includes a functional bearing disposed at the shaft portion between the motor-generator and the impeller and capable of supporting rotatably the shaft, a rotation sensor for detecting the number of revolution of the shaft and a controller for changing the functional bearing to the shaft supporting state in response to a detection signal by the rotation sensor representing that the number of revolution of the shaft is above a predetermined number of revolution, and wherein the functional bearing is operated in the free state and the two bearings support the shaft rotatably when the shaft rotates at a normal number of revolution such as up to 120,000 rpm because the problem of deflection of the shaft does not occur in such a revolution range, in order to reduce rotational friction of the shaft and to prevent the drop of response of the rotation and stop of the shaft and its rotation control, the shaft is supported by one more bearing, or the functional bearing described above, in addition to the two bearings or by three bearings in the high speed revolution range of the shaft in order to suppress deflection of the shaft by the functional bearing, to prevent the occurrence of the trouble of rotation due to deflection of the shaft, to secure the smooth rotation of the shaft and to prevent the drop of efficiency of the turbocharger and the motor-generator.

DESCRIPTION OF THE PREFERRED EMBODIMENTS

Figure 1:
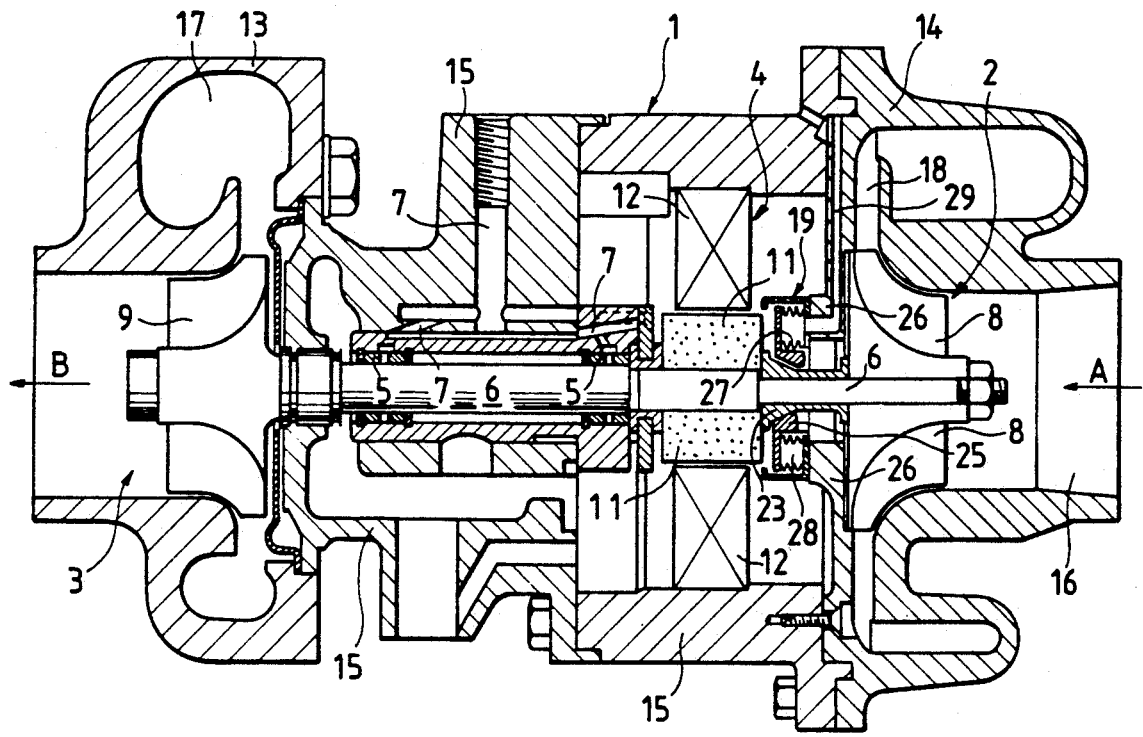
FIG. 1 is a sectional view showing a turbo-charger with a built-in bearing device for high speed rotary shaft in accordance with an embodiment of the present invention.

Hereinafter, one embodiment of the bearing device for a high speed rotary shaft in accordance with the present invention will be described in detail with reference to the accompanying drawings. In FIG. 1, the turbo-charger with the built-in bearing device for a high speed rotary shaft in accordance with the present invention is represented generically by reference numeral 1. This turbo-charger 1 includes a turbine 3 driven by an exhaust gas of an engine, a compressor 2 for supercharging air to the engine when driven by the turbine 3 and a motor-generator 4 driven by the turbine 3.

The motor-generator 4 operates as a generator for generating A.C. power and a motor for generating mechanical power by receiving A.C. power. It is a ultrahigh speed motor-generator 4 capable of ultra-high speed rotation of from about 150,000 to 200,000 rpm. The turbine 3 comprises a blade 9 as a first rotary member disposed inside a turbine housing 13. The compressor 2 comprises an impeller 8 as a second rotary member inside a compressor housing 14. A compressor scroll 18 of the compressor 2 is communicated with an intake manifold of the engine through an intake pipe. The blade 9 of the turbine 3 and the impeller 8 are connected in transmission coupling. In other words, the impeller 8 is fixed to one of the ends of the shaft 6 of the turbocharger 1 through a compressor shaft portion which is integral with the shaft 6 and the blade 9 is fixed to the other end of the shaft 6 of the turbo-charger 1 through a turbine shaft.

The motor-generator 4 disposed at the intermediate part of the shaft 6 that connects the blade 9 of the turbine 3 to the impeller 8 has the same construction and the same functions as those of the conventional motor-generator in the turbo-charger of the internal combustion engine of the prior art, and operates as the motor or the generator. This motor-generator 4 comprises a rotor 11 as a third rotary member which is fitted to the shaft 6 penetrating through the inside of the center housing 15, extends in the axial direction and is made of a permanent magnet, and a stator 12 consisting of a stator core, stator winding, etc. The shaft 6 of the turbo-charger 1 is supported rotatably by a pair of bearings 5, 5 fixed to the center housing 15. The blade 9 of the turbine 3 rotates by receiving the flow of the exhaust gas sent from the exhaust manifold of the engine to the turbine scroll 17, that is, exhaust energy, and the exhaust gas is exhausted in the axial direction of the shaft 6 or in the direction represented by arrow B. The impeller 8 of the compressor 2 pressure-converts the air introduced from the intake port 16 into the compressor scroll 18 as represented by arrow A by a diffuser and sends it into the intake manifold of the engine through the air passage or in other words, the intake pipe.

The motor-generator 4 is controlled by the controller, is driven by the turbine 3 to induce a voltage in the stator coil and returns this voltage to the power source side. It operates as a motor capable of charging the regenerated voltage to a battery or utilizing it as a load and as a motor by receiving the A.C. power from the battery. The shaft 6 is supported on the center housing 15 by a pair of bearings 5, 5 and lubricant is supplied to these bearings 5, 5 from a lubricant feed path 7 communicating with a lubricant feed source such as an oil gallery to lubricate them.

The bearing device for a high speed rotary shaft in accordance with the present invention includes a functional bearing 19 in order to keep always the shaft 6, whose one end side is supported rotatably through the pair of bearings 5, 5 and whose other side is placed under the free state having a large mass, under the balanced state. For instance, in the turbo-charger 1 of the type wherein the blade 9 of the turbine 3 is disposed at one of the ends of the shaft 6, the impeller 8 of the compressor 2 is fitted to the other end and the motor-generator 4 having the rotor 11 is disposed between the blade 9 and the impeller 8 as described above, the bearing device of the present invention includes the pair of bearings 5, 5 for rotatably supporting the shaft between the blade 9 and the motor-generator 4 on the housing 15 and the functional bearing 19 for supporting the shaft 9 at the position in the proximity of the compressor 2 in a high speed revolution range.

Figure 3:
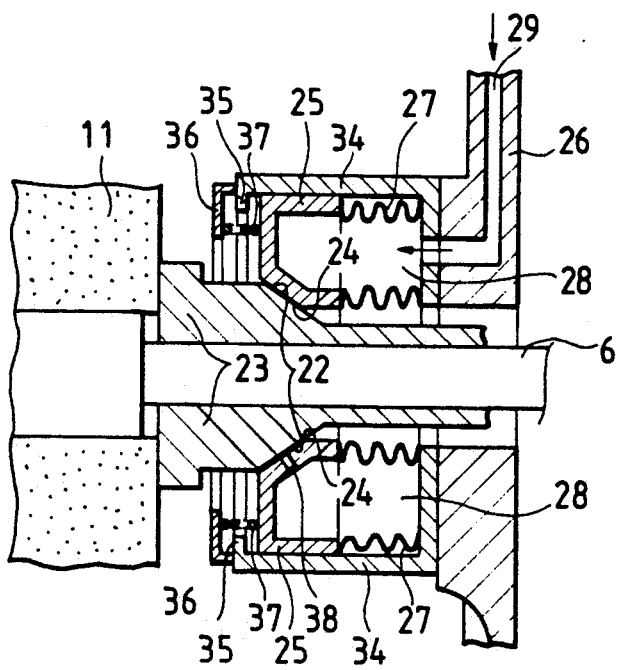
FIG. 3 is a sectional view showing the engagement state of the principal portions of the functional bearing showing in FIG. 1.
Figure 4:
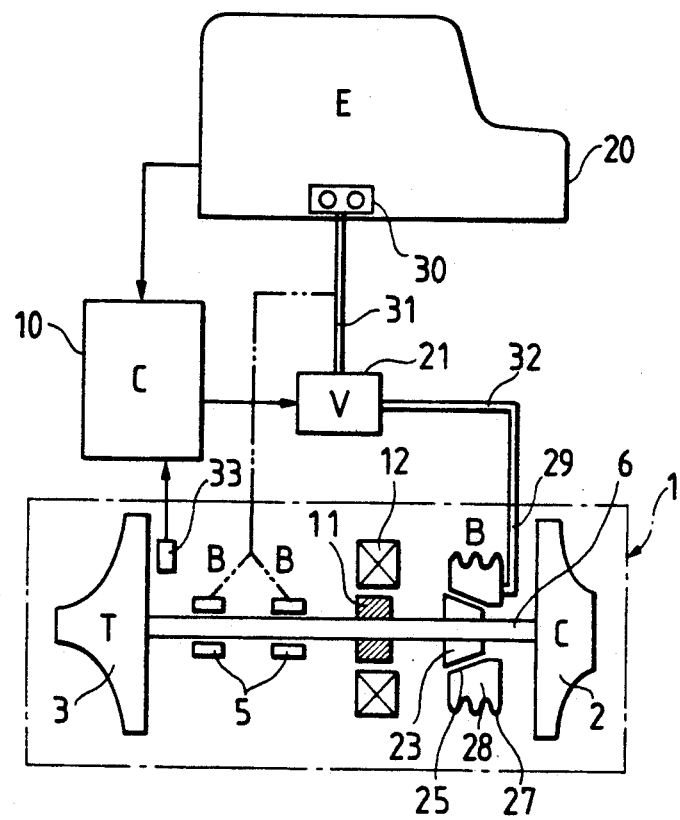
FIG. 4 is an explanatory view useful for explaining the bearing device for a high speed rotary shaft in accordance with one embodiment of the present invention.
Figure 7:
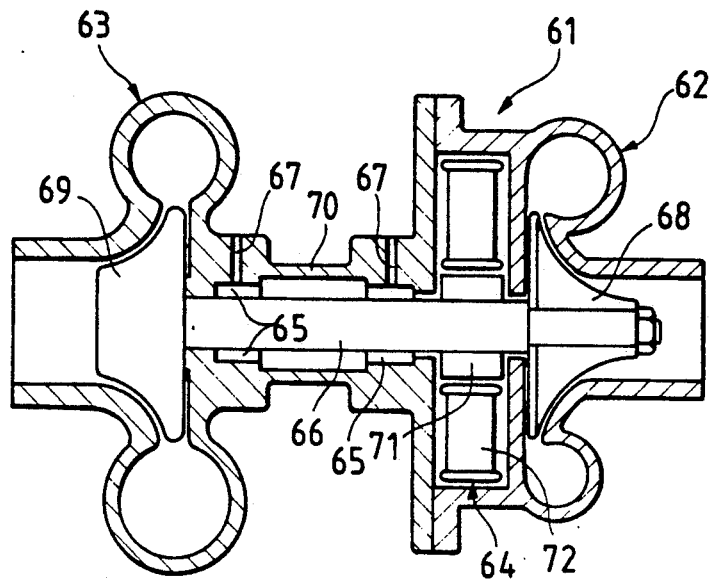
FIG. 7 is a sectional view showing an example of a conventional turbo-charger of an internal combustion engine.

Next, the functional bearing 19 will be explained with reference to FIGS. 1, 2, 3 and 4. A large mass such as a rotor made of a permanent magnet is fitted to the free end of the shaft 6 in the same way as the shaft 6 of the turbo-charger 1 described above and the shaft is represented by the same reference numeral as described above. The shaft 6 is supported rotatably by the pair of bearings and the functional bearing 19 capable of supporting rotatably the shaft 6 is disposed at the free end of this shaft 6. The functional bearing 19 includes a first ring-like bearing member 23 having a taper surface 22 serving as a bearing formation surface and fitted to the shaft 6 and a second ring-like bearing member 25 having a taper surface 24 capable of butting against the taper surface 22 of the first ring-like bearing member 23 and capable of moving in the axial direction. One of the ends of an extensible ring-like bellows pipe 27 is fixed to the housing 26 and the other end is fixed to the second ring-like bearing member 25. An extensible oil pressure chamber 28 is defined by this ring-like bellows pipe 27 in cooperation with the second ring-like bearing member 25 and the housing 26. The oil is supplied into the oil pressure chamber 28 through an oil pressure passage 29 formed in the housing 26. The oil to be supplied to this oil pressure chamber 28 is fed into it by an oil pump 30 which is disposed for supplying the lubricant into the engine 20 as shown in FIG. 4, for example. A ring-like support member 34 fixed to the housing 26 is disposed on the outer peripheral surface of the second ring-like bearing member 25. Further, a ring-like support member 34 fixed to the housing 26 is disposed on the outer peripheral surface of the second ring-like bearing member 25. This ring-like support member 34 prevents oscillation of the second ring-like bearing member 25 in the radial direction. A stopper 35 formed at the tip of the ring-like support member 34 limits the moving range of the second ring-like bearing member 25 in the axial direction and thus prevents the taper surface 22 of the first ring-like bearing member 23 and the taper surface 24 of the second ring-like bearing member 25 from entering the excessively pressed state and provides an excellent bearing surface. Further, a spring seat 36 is disposed at the tip of the ring-like support member 34 and a return spring 37 is interposed between the spring seat 36 and the ring-like support member 34. When the oil pressure in the oil pressure chamber 28 is released, the return spring 37 contracts the oil pressure chamber 28 and returns the second ring-like bearing member 25 to its original position. A through-hole 38 is formed on the second ring-like bearing member 25 so as to supply the oil or lubricant to the contact surface between the taper surface 22 and the taper surface 24 as the bearing formation surface.

The functional bearing 19 has the construction as described above. When the oil is supplied or cut off to the ring-like bellows pipe 27, the oil pressure chamber 28 causes expansion and contraction and at the same time, the second ring-like bearing member 25 reciprocates in the axial direction. In other words, reciprocation of the second ring-like bearing member 25 in the axial direction constitutes an actuator and when the oil is supplied to the oil pressure chamber 28 and the ring-like bellows pipe 27 extends, the second ring-like bearing member 25 moves in the axial direction as shown in FIG. 3 so that its taper surface 24 comes into contact with the taper surface 22 of the first ring-like bearing member 23 and the functional bearing 19 enters the operative state where it supports rotatably the shaft 6 between the first and second ring-like bearing members 23 and 25. In this manner the second ring-like bearing member 25 functions to prevent the oscillation of the shaft 6. The supply of the oil to the oil pressure chamber 28 of the functional bearing 19 is accomplished in the following way. As shown in FIG. 4, a rotation sensor 33 detects the number of revolution T of the shaft 6 when it exceeds a predetermined number of revolution Ro, and the controller 10 receives this detection signal and generates a signal for opening a solenoid valve 21 in response to this detection signal.

Figure 6:
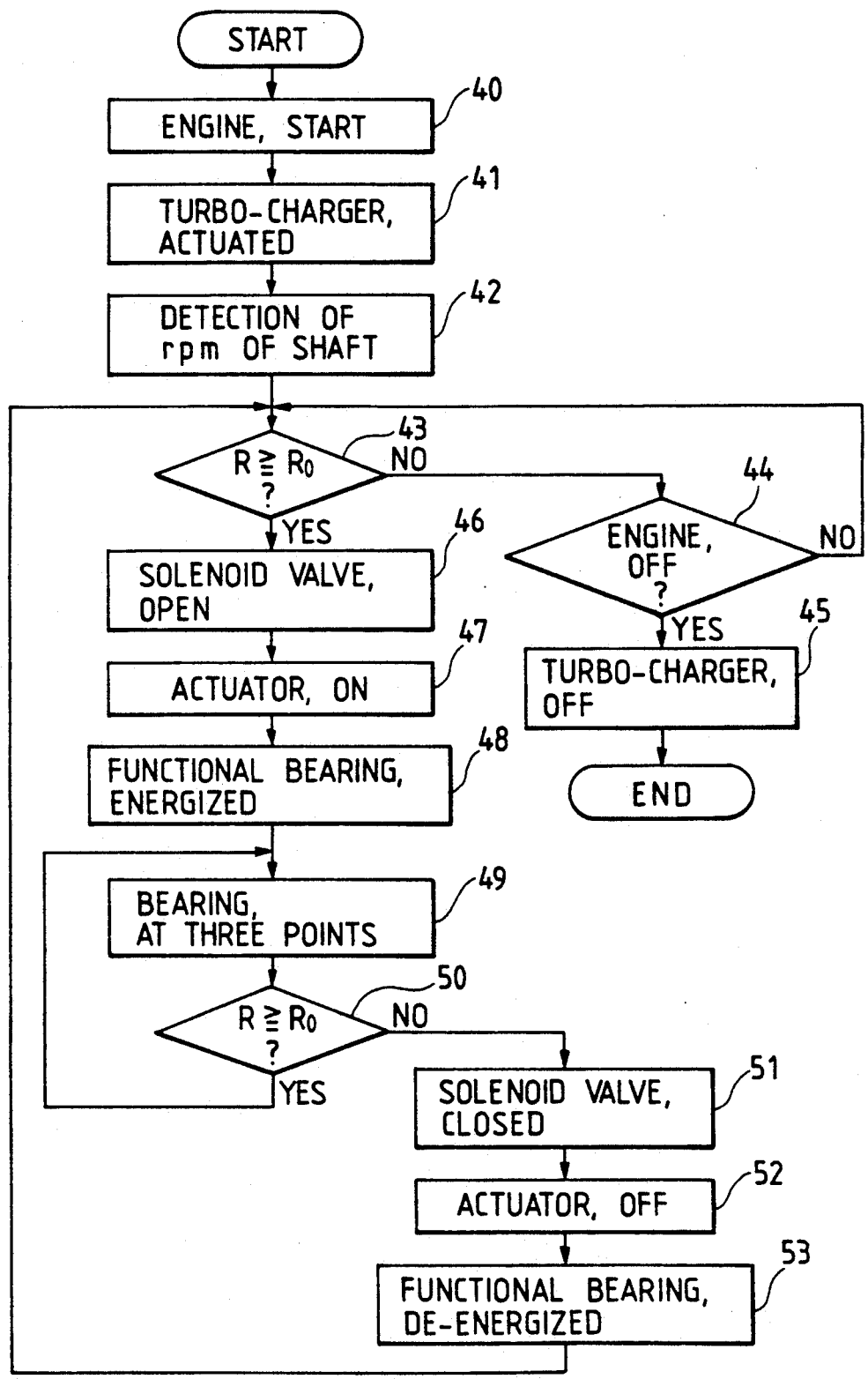
FIG. 6 is an operation flowchart useful for explaining the turbo-charger with the built-in bearing device for a high speed rotary shaft in accordance with the present invention.

Next, the operation of the bearing device for a high speed rotary shaft of this invention and its control will be explained with particular reference to the operation flowchart shown in FIG. 6.

When the engine 20 is started, the turbo-charger 1 is activated and the revolution of the blade of the turbine 3 operates the motor-generator 4 to induce the voltage in the stator coil. This voltage is returned to the power source side and the regenerated voltage is charged in the battery or utilized as a load. These functions of the motor and the function of the motor-generator 4 as the motor by receiving the A.C. power from the battery are the same as those of the conventional turbo-charger 1 and their explanation will be omitted.

The operations of the turbo-charger 1 with the built-in bearing device for a high speed rotary shaft in accordance with the present invention have the following characterizing features.

First of all, the engine 20 is started (step 40) and the turbo-charger 1 is activated (step 41). The rotation sensor 33 detects the number of revolution of the shaft 6 of the turbo-charger 1 in response to its operation (step 42). The rotation signal of the shaft 6 obtained from the rotation sensor 33 is inputted to the controller 10.

The rotation signal of the shaft 6 inputted to the controller 10 is amplified to an electric signal suitable for control. Incidentally, the limit of the number of revolution Ro of the shaft at which the shaft 6 can be supported at two points or in other words, by the pair of bearings 5, that is, the maximum value of the normal number of revolution of the shaft 6 is determined in advance and this number of revolution Ro is inputted to a parameter setter of the controller 10. Therefore, whether or not the number of revolution R of the shaft 6 is greater than the set number of revolution Ro is judged by comparing the electric signal of the detected number of revolution R of the shaft 6 with the electric signal of the number of revolution Ro in the high speed range which is set in advance (step 43).

Let's assume the case where the car runs on a highway, for example, the revolution of the engine 20 rises to increase exhaust energy and the number of revolution R of the shaft 6 of the turbo-charger 1 rises and becomes greater than the predetermined number of revolution Ro. Then, the actuator of the functional bearing 19 is activated and the functional bearing 19 prevents the occurrence of oscillation at the free end of the shaft 6. Accordingly, the processing proceeds to step 46.

If the engine 20 as well as the turbo-charger 20 are operating (step 44) but the number of revolution of the engine 20 does not rise and the number of revolution R of the shaft 6 of the turbo-charger 1 is smaller than the predetermined number of revolution Ro, the rotation sensor 33 detects successively the number of revolution R of the shaft 6 and inputs the detection signal to the controller 10 so as to compare and judge the number of revolution R with the predetermined number of revolution Ro (step 43). When the operation of the engine 20 is stopped, however, the operation of the turbo-charger 1 is stopped (step 45), too, and the processing control of the operation of the bearing device for a high speed rotary shaft is complete.

Figure 5:
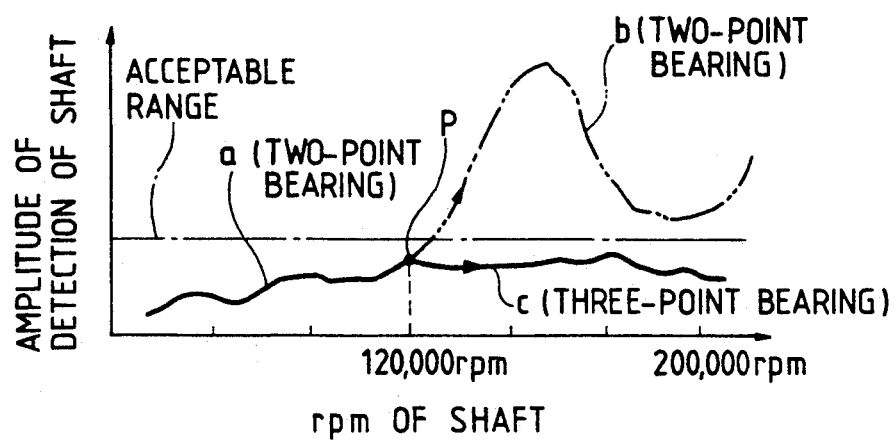
FIG. 5 is a diagram useful for explaining the function of the bearing device for a high speed rotary shaft in the present invention.
Figure 2:
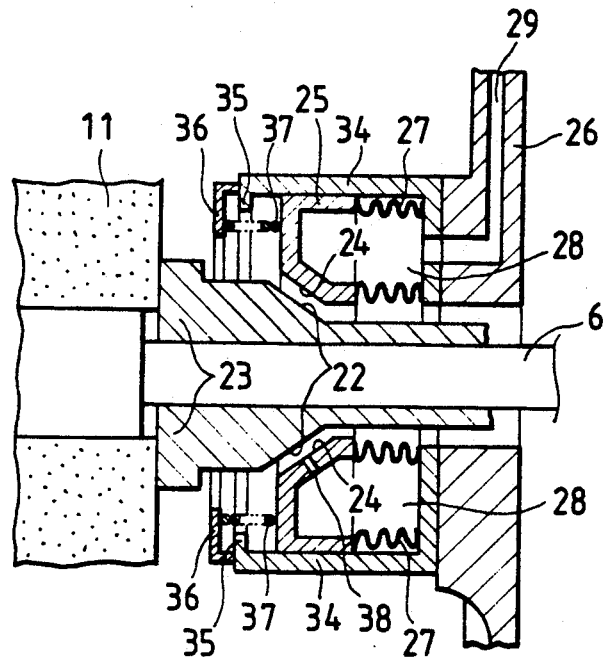
FIG. 2 is a sectional view showing the engagement state of the principal portions of a functional bearing shown in FIG. 1.

When the number of revolution R of the shaft 6 rises and becomes greater than the predetermined number of revolution Ro, the controller 10 generates the signal for opening the solenoid valve 21, activates a solenoid for activating the solenoid valve and opens the solenoid valve 21 (step 46). When the solenoid valve 21 opens, the oil sent out from the oil pump 30 which is driven for lubricating each component of the engine 20 passes sequentially through the oil passage 31, the solenoid valve 21, the oil passage 32 and the oil passage 29 of the center housing 15 of the turbo-charger 1 and is sent into the oil pressure chamber 28 of the functional bearing 19. When the oil enters the oil pressure chamber 28, the ring-like bellows pipe 27 extends and plays the role of the actuator (step 47) so that the second ring-like bearing member 25 moves in the axial direction of the shaft 6 from the state shown in FIG. 2 to the state shown in FIG. 3. The movement of the second ring-like bearing member 25 in the axial direction brings the taper surface 24 of the second ring-like bearing member 25 as the bearing formation surface into contact with the taper surface 22 of the first ring-like bearing member 23 as the bearing formation surface and the functional bearing 19 operates under the bearing supporting state (step 48). Since the functional bearing 19 is operative or in other words, since it plays the bearing function for supporting the shaft 6, the shaft 6 is under three-point support state by the pair of bearings 55 and by the functional bearing 19 (step 49). At this time the oil sent into the oil pressure chamber 28 is supplied to the taper surfaces 22, 24 as the bearing formation surface through the through-hole 38 and lubricates the contact surface. Accordingly, the functional bearing 19 can exhibit smooth bearing function without causing seizure or the like. When the shaft 6 enters the state where it is supported at the three points, the free end portion of the shaft 9 is supported by the functional bearing 19 even when the shaft 6 rotates at a rated number of revolution e.g. 150,000 rpm exceeding the maximum value of its normal number of revolution, i.e., 20,000 rpm, deflection of the shaft 6 that has been generated conventionally by the centrifugal force (dash line b in FIG. 5) is suppressed and deflection of the shaft 6 does not occur (solid line c of FIG. 5).

Subsequently, the rotation sensor 33 detects the number of revolution R of the shaft 6 and this number of revolution R is compared with the predetermined number of revolution Ro for judgement (step 50). If the state where the number of revolution R is greater than Ro (R≧Ro) continues, the operation state of the functional bearing 19 is maintained and the shaft 6 is kept as such under the three-point support state.

However, when the revolution of the shaft 6 drops and the number of revolution R becomes smaller than Ro, it is no longer necessary to keep the shaft 6 by three-point under the operation state of the functional bearing 19. Therefore, the operation state of the functional bearing 19 is released. However, friction by the functional bearing 19 increases when the shaft 6 is supported at the three points, particularly at the time of a low rotating speed. Therefore, the function of the functional bearing 19 is invalidated in order to eliminate the friction between the shaft 6 and the functional bearing 19, to improve response and to eliminate the drop of efficiency. In other words, when the number of revolution R detected by the rotation sensor 33 is smaller than the number of revolution Ro, the controller generates the signal for cutting of the solenoid valve 21, operates the solenoid for driving the solenoid valve and closes the solenoid valve 21 (step 51). When the solenoid valve 21 is closed, the oil is not supplied to the oil pressure chamber 28 but leaks from the through-hole 38 of the second ring-like bearing member 25 due to the operation of the return spring 37 so that the actuator operation is OFF (step 52). When the actuator is OFF, the oil pressure chamber 28 contracts and the taper surface 24 of the second ring-like bearing member 25 is released from the engagement with the taper surface 22 of the first ring-like bearing member 23. Accordingly, the operation of the functional bearing 19 is OFF (step 53).

When the operation of the functional bearing 19 is OFF, the processing then proceeds to step 43. In other words, the rotation detection signal by the rotation sensor 33 is inputted to the controller 10 and the comparison/judgement control of the number of revolution R of the shaft 6 with the predetermined number of revolution Ro is repeated in the controller 10.

What is claimed is:

1. A bearing device for a high speed rotary shaft, having a turbine to be driven by the energy of an exhaust gas discharged from an engine, a shaft on one end portion of which said turbine is mounted, a compressor mounted on the other end portion of said shaft, a motor-generator mounted on the portion of said shaft which is between said turbine and said compressor, a pair of bearings disposed between said turbine and said motor-generator, and a housing supporting said shaft rotatably via said bearings, comprising:
   a functional bearing mounted on the portion of said shaft which is between said motor-generator and said compressor, said functional bearing being able to be changed over to either a supporting state in which said shaft is supported rotatably on said housing or a free state in which said shaft is not supported rotatably on said housing;
   an actuator for operating said functional bearing either in said supporting state or in said free state;
   an oil pump for supplying a lubricating oil to said engine;
   an oil supply means for supplying a working oil from said oil pump to said actuator so as to operate the same, said oil supply means being provided with an oil passage establishing communication between said oil pump and said actuator and a solenoid valve provided in said oil passage for opening and closing the same;
   a rotation sensor to detect the revolutions per minute of said shaft; and
   a controller to open said solenoid valve in response to a revolution-detected signal from said rotation sensor which shows that the detected revolutions per minute of said shaft is not less than a preset level, supply said working oil from said oil pump to said actuator and operate the same, and change said functional bearing to said supporting state and support said shaft rotatably on both said pair of bearings and said functional bearing, or close said solenoid valve in response to a revolution-detected signal from said rotation sensor which is indicative that the detected revolutions per minute of said shaft is not more than a preset level, set said actuator in a non-operating state and said functional bearing in a free state, and support said shaft rotatably on said pair of bearings alone.

2. A bearing device for a high speed rotary shaft according to claim 1, wherein said functional bearing include a first ring-like bearing member having a tapering surface and fitted around said shaft, and an axially movable second ring-like bearing member having a tapering surface and fixed to said housing; said supporting state in which said functional bearing supports said shaft rotatably on said housing being attained by moving said tapering surface of said second ring-like bearing member axially by an action of said working oil so that the same tapering surface can be slidingly moved on said tapering surface of said first ring-like bearing member; and free state in which said functional bearing does not support said shaft rotatably on said housing being attained by setting said tapering surfaces of said first and second ring-like bearing members in a non-contacting condition.

3. A bearing device for a high speed rotary shaft according to claim 1, wherein said actuator has bellows one end of which is fixed to said tapering surface-carrying second ring-like bearing member; said bellows being extendable by said working oil supplied from said oil pump thereinto, the extension of said bellows causing said tapering surface of said second ring-like bearing member to be moved axially so that the same tapering surface can be slid on said tapering surface of said first ring-like bearing member.

4. A bearing device for a high speed rotary shaft according to claim 3, wherein said tapering surface of said second ring-like bearing member is provided with a through hole, through which said working oil from said oil pump is discharged.

* * * * *